Figure 1:
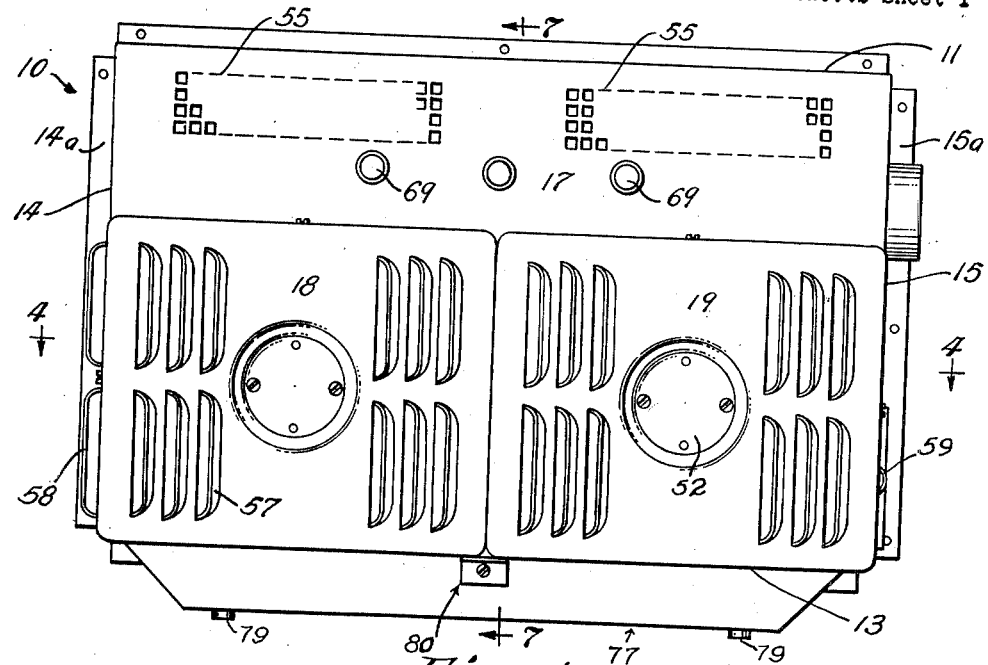

Jan. 11, 1955

A. G. BERGSTROM 2,699,323

AUTOMOTIVE HEATER

Filed June 8, 1951

3 Sheets-Sheet 1

Inventor
Adolph G. Bergstrom
By McCanna and Morsbach
Attys.

Jan. 11, 1955   A. G. BERGSTROM   2,699,323
AUTOMOTIVE HEATER
Filed June 8, 1951   3 Sheets-Sheet 2

Inventor
Adolph G. Bergstrom
By McCanna and Morsbach
Attys.

Jan. 11, 1955  A. G. BERGSTROM  2,699,323
AUTOMOTIVE HEATER
Filed June 8, 1951  3 Sheets-Sheet 3

Inventor
Adolph G. Bergstrom
By McCanna and Morsbach
Attys.

United States Patent Office 2,699,323
Patented Jan. 11, 1955

2,699,323

AUTOMOTIVE HEATER

Adolph G. Bergstrom, Rockford, Ill., assignor to Bergstrom Manufacturing Co., Rockford, Ill., a corporation of Illinois Application June 8, 1951, Serial No. 230,532

10 Claims. (Cl. 257—137)

This invention relates to hot air heaters, and particularly to large capacity heaters for use in automotive vehicles, such as passenger buses.

It is an object of this invention to provide a novel heater of improved construction for heating air and discharging the heated air at a faster rate than heretofore accomplished.

A further object of this invention is to provide a heater which discharges a desired amount of heated air for heating the passenger space in the vehicle independent of whether or not the windshield defroster is on.

It is also an object of this invention to provide a heater in which air from the interior of the vehicle is heated and is mixed with a certain proportion of heated fresh air and is recirculated into the passenger space in the vehicle, and wherein fresh air is heated and supplied to the windshield defrosters of the vehicle.

Another object of this invention is to provide a heater having a heat source which has defined areas for heating recirculated air from within the vehicle and other defined areas for heating fresh air drawn from outside the vehicle.

Another object of this invention is to provide a vehicle heater in which the components of the heater housing are supported and assembled in a novel structural relationship which facilitates servicing and repair of the heater.

Other and further objects of the invention will be apparent from the following description of a preferred embodiment.

Figure 2:
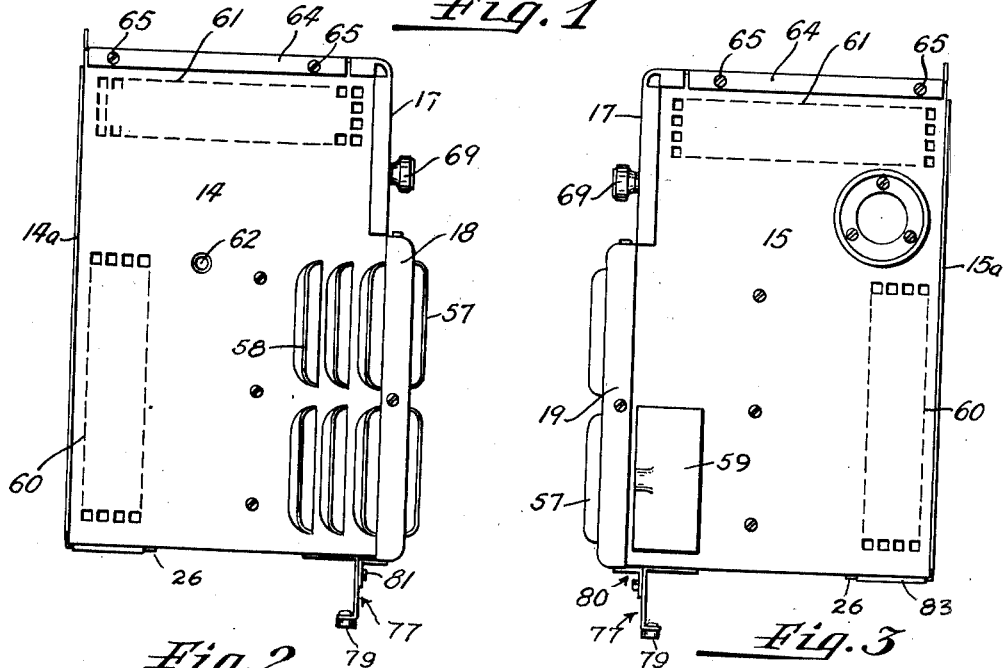
Figure 3:
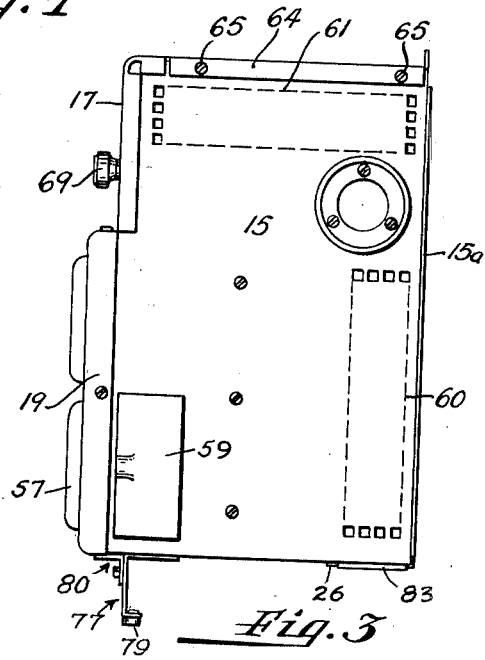
Figure 4:
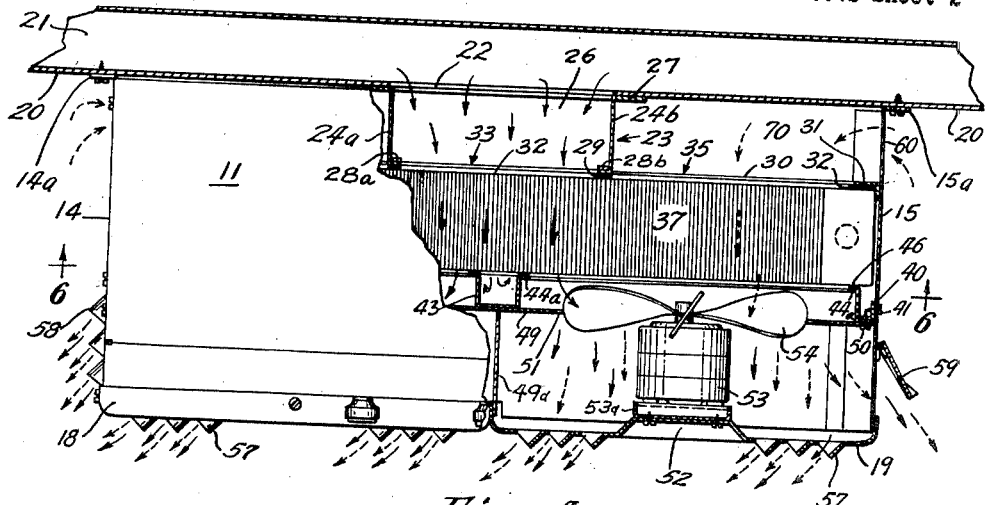
Figure 5:
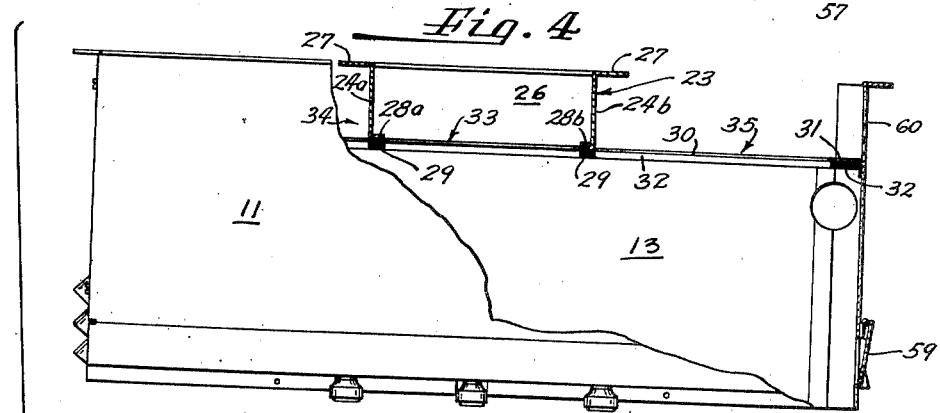
Figure 5:
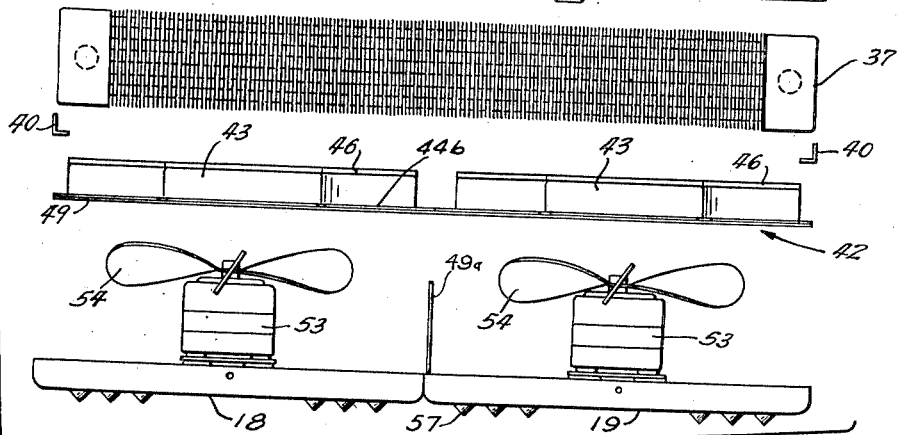
Figure 6:
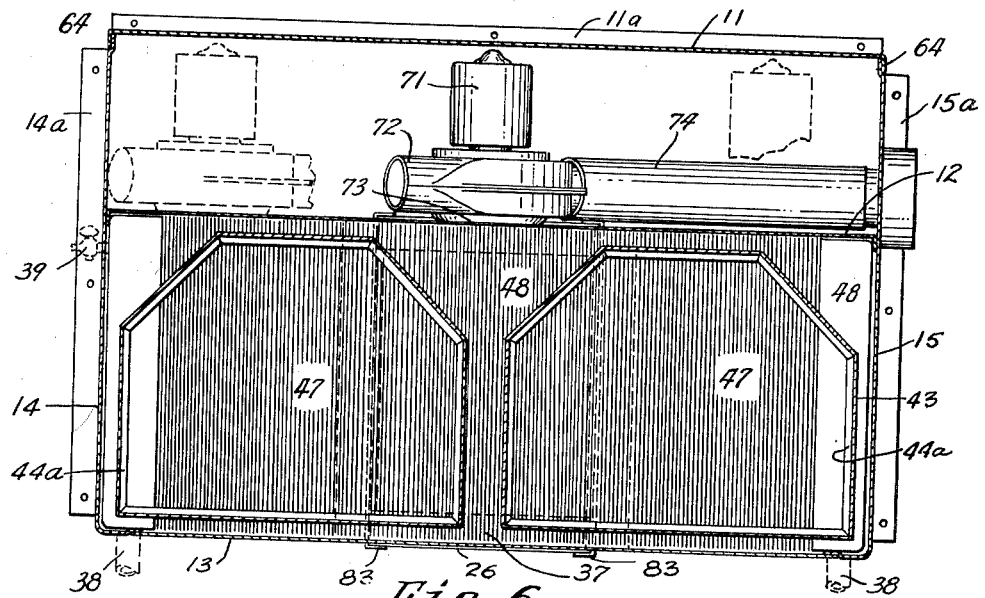
Figures 7, 8:
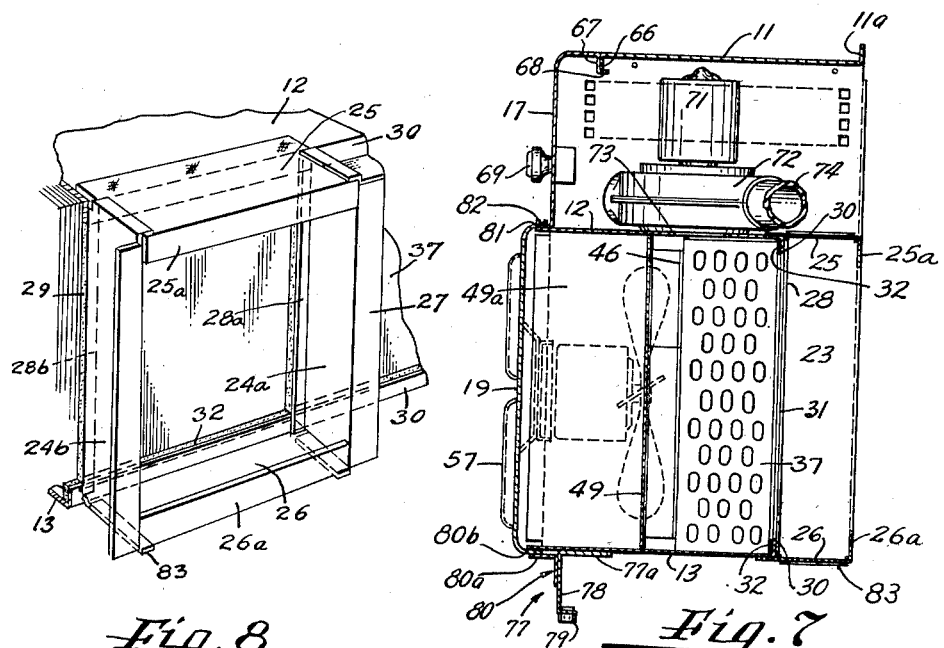

In the drawings:

Figure 1 is a front elevation of a heater constructed in accordance with this invention. Figure 2 is an end elevation showing the left end of the heater of Figure 1. Figure 3 is an end elevation showing the right end of Figure 1. Figure 4 is a plan view, partly broken away along the line 4—4 of Figure 1. Figure 5 is an exploded plan view of the heater, with the housing partly removed. Figure 6 is a vertical longitudinal sectional view along the line 6—6 of Figure 4, Figure 7 is a vertical cross-section along the line 7—7 of Figure 1, and Figure 8 is a fragmentary perspective view illustrating the guard member for the fresh air inlet.

In present day automotive heaters it is common practice to circulate a portion of the cooling agent from the internal combustion engine which drives the vehicle through a radiator core to heat the same and to provide a motor-driven blower to cause air to move over the core and be heated thereby. This heated stream of air is then directed into certain zones in the vehicle which it is desired to heat, such as the space occupied by the passengers and the windshield defrosters of the vehicle. While recirculated air is satisfactory for the space heating in the vehicle, it is often preferable that hot air being supplied to the windshield defrosters be substantially entirely fresh air, since fresh air is ordinarily less humid than the recirculated air and therefore is more efficient in removing condensed vapor from the windshield. In the present invention substantially the entire volume of heated air supplied to the windshield defrosters is fresh air drawn in from outside the vehicle and the windshield defrosters are thereby rendered more efficient in their operation.

In addition, in conventional vehicle heaters, wherein air flow to the defrosters is not segregated from the air flow to the passenger space in the vehicle, it often happens that when the heater is operating to supply hot air to the defrosters this reduces proportionally the amount of hot air supplied to the passenger space in the vehicle. In some instances of present day automotive heater designs the blower for supplying air to the defrosters acts against the fans which blow hot air into the passenger space in the vehicle, so that the heater is inherently inefficient in its operation. In the present invention, the blower for the defroster does not substantially affect the amount of hot air blown into the vehicle passenger space, so that heating of the passenger space is substantially independent of whether the defrosters are on. Furthermore, the present invention is more efficient in its operation since the defroster blower in no way acts against the blowers for heating the passenger space. These advantageous results are effected by a novel construction in which the intake air enters the housing substantially completely around the fan shroud, so as to increase the volume of air passing through the heater and to render the heater more efficient in its operation.

Referring to the drawings, the heater of the present invention is enclosed in a housing 10 which includes a top 11, a bottom 13, end walls 14 and 15, an upper front panel member 17, two removable lower front panel members 18 and 19, and an internal horizontal partition 12 which extends rearwardly from the juncture of upper front member 17 and lower front members 18 and 19. When assembled, horizontal partition 12 and upper front panel 17 are secured fixedly to end walls 14 and 15, as by being welded thereto. The end walls 14 and 15 are formed with transverse flanges 14a and 15a for attachment to back wall 20. The top plate 11 is also formed with a transverse upstanding flange 11a for attachment to back wall 20. All of the housing walls are preferably made of sheet metal.

An air duct 21, which communicates with the exterior of the vehicle is provided to admit fresh air from outside the vehicle to an opening 22 formed in rear wall 20. Duct 21 may preferably be defined by spaced walls of the vehicle, the outer of which forms a portion of the exterior shell or body of the vehicle. A box-like guard member 23 snugly abuts against rear wall 20 and extends around the aperture 22 therein so as to receive the air flow from duct 21. This guard member 23 is formed with upstanding side walls 24a and 24b, a top wall 25, and a bottom wall 26 which is secured to the inturned flanges 83 and to the lower ends of the side walls. At the rear of guard 23 the side walls 24a and 24b are formed with transverse out-turned flanges 27 and the top and bottom walls are formed with transverse inturned flanges 25a and 26a, respectively, by means of which the guard member 23 snugly engages back wall 20 so as to enclose the aperture 22. At the front face of guard member 23 the side walls 24a and 24b thereof have their forward edges bent transversely to present flanges 28a and 28b. Sponge rubber or composition seal strips 29 are cemented, or otherwise fixedly sealed to the flanges 28a and 28b. As best seen in Figure 7, the top and bottom walls 25 and 26, respectively, of the guard member 23 extend forwardly beyond the flanges 28a and 28b and are welded, or otherwise secured, to intermediate horizontal partition 12 and bottom member 13, respectively, in overlapping relation therewith.

The bottom wall 13 and the interior intermediate partition 12 extend rearwardly from the front of the housing into proximity to the front face of guard 23 and are formed with transverse inturned flanges 30. A pair of L-shaped strips 31 are provided, each of which has one leg thereof secured as by welding to the end walls of the housing with the other legs thereof disposed coplanar with the inturned flanges 30 and extending therebetween. This construction forms a rectangular frame adjacent the front face of guard member 23 the bottom wall 13 and the intermediate partition 12 forming opposed sides of the frame and the end walls 14 and 15 forming opposed ends of the frame. Sealing strips 32 are provided at the inturned front face of each flange 30 and at the front face of each upstanding side strip 31.

It will be noted that since horizontal partition 12 does not extend completely to the rear of the interior of the housing 10 there is communication between the chambers above and below partition 12 at the rear of the housing, except for the enclosed chamber formed by guard 23. Thus the guard 23 serves to partition the rear of the housing into three chambers 33, 34, and 35, wherein chamber 33 communicates only with the fresh air duct 21 while chambers 34 and 35 communicate with recirculated air intakes at the bottom, front and end walls of the housing, as will appear hereinafter. A radiator core 37, consisting of a plurality of pipes extending lengthwise of the housing and a plurality of fins attached thereto which extend transversely of the housing, is mounted within the housing below partition 12 and immediately in front of guard 23 and the rectangular frame formed by flanges 30 and side strips 31. The radiator core is provided with connections 38 to the cooling system of the internal combustion engine for the vehicle, so that the heated fluid which has served as the coolant for the internal combustion engine is circulated through the pipes of the radiator to heat the fins. An air-relief cock 39 is provided for the radiator core at one end of the housing. In assembled relation, the radiator core 37 snugly abuts against the sealing strips 29 and 32. Intake air drawn into chambers 33, 34, 35 passes over the exposed fin areas of radiator 37 to be heated thereby.

Angle iron braces 40 are affixed to the end walls 14, 15 of the housing forwardly of the radiator core 37 by means of self-tapping screws 41. A guard plate, indicated generally at 42 is provided with a pair of spaced offset housings 43 each of which is formed of a generally Z-shaped strip bent to form a multi-sided frame having inturned flanges 44a on the rear edges thereof and outturned flanges 44b on the front edges thereof. The housings extend rearwardly and abut against the forward face of radiator 37. The spaced housing members 43 are provided with rear openings defined by transversely extending rear flanges 44a, which abut snugly against the forward face of radiator core 37, with sealing gaskets 46 of sponge rubber or composition material interposed therebetween to provide an air-tight seal. As best seen in Figure 6, each flange 44a defines an opening of six-sided configuration in the front of each housing 43 communicating with the air intake chambers at the other side of radiator 37 to receive air passing over the radiator to be heated thereby. The guard member 42 also includes a forward plate 49 formed with a pair of apertures 51 which communicate respectively with the housings 43. The out-turned flanges 44b on the housings 43 are secured to the wall 49 about the apertures 51 therein as by welding. By this construction the guard member 42 defines partition means forming three separate chambers at the outlet side of the radiator. As best seen in Figure 6, the two confined areas 47 are defined by the housings 43, and an encircling area 48 is provided which extends between the housings 43 and around the same, this encircling area being the space between wall 49 and the front face of radiator 37. The entire assembly of guard plate 42 is affixed to angle irons 40 by means of screws 50. By virtue of this construction air drawn in through the chambers 34 and 35, after being heated, passes into the respective confined chamber 47, while the fresh air drawn in through chamber 33 passes to the space 48 between and around the confined chambers 47. Of course, there is some mixture of fresh air and recirculated air within each of the chambers 47 and in the space 48, but the described construction is such that the air drawn into space 48 is mainly fresh air.

Each of the lower front panels 18 and 19 of the housing is provided with a depressed central portion 52, which supports a motor 53 for driving a blower fan 54. Motor mounting plates 53a are rigidly connected to the respective portions 52. Preferably resilient rubber mounting members are interposed between each motor and the respective mounting plate 53a to absorb mechanical vibrations and prevent misalignment of the motor and fan blades after long-continued use. The blades of each fan 54 are positioned to rotate within the space formed by the corresponding aperture 51 in the wall 49 of the guard member 42. Only a slight clearance is provided in each of these apertures for the respective fan blades. There is thus provided a plenum chamber for each fan in which the recirculated air and some fresh air are mixed.

Louvers 57 are formed in the front faces of members 18 and 19 to direct the streams of heated air into the passenger space in the vehicle. Also, in the illustrated form of the invention, louvers 58 are provided in the end member 14, while the end member 15 is provided with a pivoted door 59 for the egress of heated air.

A vertical partition 49a separates the two outlet chambers in which the respective fans 53 are positioned. This partition is attached to the lower front panel member 19 and extends rearwardly therefrom to completely separate the lower front outlet chambers. The partition thus prevents turbulence at the outlet side of the space heater fans since it sets up definite separate flow patterns and prevents one fan from blowing into the outlet chamber of the other fan. In addition, fan noise is reduced.

At its rear edge the partition 49a is preferably provided with a cushion member of resilient rubber (not shown) which when the heater is assembled bears against plate 49. With this arrangement, partition 49a serves as a transverse stiffener to prevent longitudinal bowing of plate 49 of the guard plate assembly 42, and at the same time the assembly does not rattle where partition 49a abuts against the plate 49.

Each of the end members 14 and 15 is provided with an apertured grill portion 60 at its rear lower portion for intake of air from the vehicle. Also each end member is formed with an upper apertured grill-like construction 61 above the horizontal partition 12. Also apertured grill portions 55 are formed in the front member 17. As best seen in Figure 7, the bottom wall 13 does not extend rearwardly as far as back wall 20, so that chambers 34 and 35 are also open at the bottom to admit air. Thus, air is drawn into the heater from a plurality of directions to increase the intake capacity of the heater. Because the horizontal partition 12 does not extend completely back through the housing air drawn in from the upper intake grills 55 and 61 is permitted to pass downwardly adjacent the rear of the radiator and then to pass over the radiator fins into the respective enclosed chambers 47.

Above the horizontal partition 12 there is provided a centrifugal blower 72 driven by a motor 71. An aperture 73 is formed in partition 12 immediately above the space 48 between the confined chambers 47 and the vortex opening of the blower is mounted immediately above opening 73. The blower draws heated air from the area 48 and discharges the same by way of outlet conduit 74 to the defrosters. While the aperture 73 is here shown as being centrally located above the space between the chambers 47, it is to be understood that a plurality of such apertures 73 may be provided in the partition 12 and one or more blowers 72 may be suitably positioned selectively over such apertures. The defroster blower may be positioned anywhere along the top of the radiator without adversely affecting the operation of the present invention. The position of the blower or blowers along the radiator does not interfere with the air flow across the radiator, and at no position of a defroster blower along the radiator does that blower rob a space heater fan of its air supply through its particular radiator inlet and outlet chambers. In some instances it may be found desirable to position the blower toward or at one end of the radiator so as to shorten the length of outlet duct 74, thereby avoiding loss of hot air velocity along the length of that duct. In addition, by making the heater flexible in regard to the position of the defroster blower along the radiator the heater is readily adaptable for particular uses where space requirements or other factors may dictate the position and length of the outlet duct 74. A plurality of defroster blowers along the radiator will, of course, increase the hot air supply to the defrosters.

By the novel construction herein provided, it will be noted that the flow of air effected by the respective blower fans 54 is substantially independent of the action of blower 72, so that subtantially the same amount of air will be drawn by the blower fans 54 operating at a given speed whether or not the defroster blower 72 is on. Thus the heater air intended for the passenger space in the vehicle is not robbed by the defroster blower.

Turning now to the assembly aspects of the present invention, it will be noted that the top 11 is formed with a transverse depending flange 66 at its forward edge. Depending end flanges 64 are also formed on top 11 and overlap the respective end walls 14 and 15 and are releasably attached thereto by screws 65. The upper front member 17 of the housing is formed with a rearwardly extending top portion flush with top member 11 and with a depending flange 67 at its rear which abuts against the forward flange 66 of top 11. Flange 67 terminates in an underturned lip 68 which engages snugly beneath flange 66. At the front panel 17 there are provided control knobs 69, by means of which the settings of rheostats for controlling the motor speeds of the blowers are determined.

Beneath the bottom 13 of the housing there extends a foot member 77 to support the housing and to space the housing above the floor of the vehicle. This foot includes a horizontal portion 77a affixed to the underside of housing bottom 13, a depending portion 78, and spaced foot pads 79. The foot pads are formed of resilient material and rest freely on the floor of the vehicle. In this manner the housing of the heater is rigidly attached to the vehicle body only at back wall 20 but not at the vehicle floor. The heater housing is thereby adapted to adjust itself to the twisting of the vehicle body during use, and misalignment of the components of the heater over a period of use of the vehicle is avoided. An angle iron 80 is affixed to the foot member 77 at the front thereof and is formed with a horizontal forward lip portion 80a extending in spaced relation below the forward edge of the bottom 13 of the housing. Each of the lower front panel members 18 and 19 is formed with an underturned flange 80b adapted to be received snugly between the horizontal angle iron lip 80a and the bottom 13 of the housing. At their upper sides each of the front panel members 18 and 19 is provided with an overturned horizontal lip 81 for attachment by means of screws 82 to the extreme forward end of the horizontal partition 12 of the housing. Thus, each of the front panel members 18 and 19 is readily removable from the housing as a whole for inspection, servicing, and repair of the bottom portion of the heater assembly from the front of the housing.

To remove the radiator core 37 for repair all that is required is to remove the front panels 18 and 19, as described, and then to remove the screws 41 from the end walls 14 and 15, whereby the guard member 42 may be removed from within the housing. Thus the radiator core is made readily accessible for removal from the heater housing.

Likewise, it is evident that the top member 11 is readily detachable from the housing as a whole, since it is merely held in place by the engagement between the flange 66 and the flange portions 67 and 68 of front panel members 18 and 19, and by the attachment to rear wall 20 at rear, upstanding flange 11a and by the attachment at end flanges 64 to the end members 14 and 15. Therefore, should it be desired to gain access to the interior of the heater above partition 12 for servicing the defroster blower assembly this may be readily accomplished.

Thus, to repair any of the fans or motors, or the defroster blower or conduit, or the radiator core it never becomes necessary to detach the heater housing from its rigid attachment to back wall 20. All of these repairs may be readily accomplished in the manner described.

In the operation of the heater embodying this construction, air from within the vehicle is drawn into the heater housing through grilles 55, 60, 61, from which it flows to the intake chambers 34, 35 on either side of intake guard member 23, and from the bottom openings of chambers 34 and 35 into those chambers. Fresh air from outside the vehicle is drawn in through duct 21 and opening 22 in back wall 20 into the intake chamber 33 formed by guard 23. From the intake chambers 33, 34, 35 the air flows across the fins of radiator 37 and is heated thereby. The heated air passes to outlet chambers 47 and the surrounding outlet chamber 48. From chamber 48 the heated air is caused by blower 72 to flow through duct 74 to the windshield defroster. From the respective outlet chambers 47 the heated air flows under the action of the respective blowers 54 to the outlets 57, 58, 59 to the passenger space in the vehicle.

Since the action of the blowers effects air flow transversely across the radiator 37 most of the air supplied to outlet chambers 47 is recirculated air which has been drawn into chambers 34 and 35 from the interior of the vehicle. Conversely, most of the air drawn by defroster blower 72 originated from the fresh air duct 21. Since the respective space heater fans are positioned adjacent different segments along the length of the radiator 37 and are supplied with separate flows of heated air through the separate inlet and outlet chambers along the length of the radiator, the action of one blower does not tend substantially to rob the other blowers of their supply of heated air. Likewise, the defroster blower receives its air supply from a source separate from the respective space heater fans and does not interfere with the air flow through the respective radiator inlet and outlet chambers therefor. This is particularly important since the defroster blower usually has a greater pull than the blowers which supply heat to the passenger space of the vehicle and therefore tends to rob the passenger space blowers of their desired hot air supply. In the described arrangement of the present invention, operation of the defroster blower 72 does not substantially disturb the pattern of air flow through the separate radiator inlet and outlet chambers transversely across radiator 37 and therefore does not substantially affect the rate of hot air delivery by fans 54.

The entry of air into the housing from a plurality of directions around the housing insures an adequate air intake supply and also contributes to the result that the air flow occurs substantially transversely across radiator 37, which would not be the case if the air were supplied from only one end wall of the housing.

While there has been described herein a preferred embodiment of the invention, it is to be understood that various changes and modifications in the specific illustrated form may be resorted to without departing from the spirit and scope of the invention. For example, where the space heat demand for the vehicle is relatively low it may be found desirable to provide only a single space heater fan and to halve the length of the radiator core. The defroster blower can be placed at any desired point along the top of the radiator core and will receive its air supply from around the enclosed radiator outlet chamber 47. The space heater fan will receive its hot air supply through that outlet chamber 47 without interference from the defroster blower.

I claim:

1. A vehicle heater comprising a flat radiator having a plurality of fins extending transversely of the flat faces thereof, partition means abutting against one side of said radiator forming a fresh air inlet chamber and a recirculating air inlet chamber adjacent different segments of said radiator, partition means abutting the other side of said radiator forming a first heated air outlet chamber registering with said recirculating air inlet chamber and a portion of said fresh air inlet chamber and a second heated air outlet chamber registering with a different portion of said radiator, fan means in said first outlet chamber for drawing air through said radiator from said recirculating air inlet chamber and said fresh air inlet chamber, a cover plate overlying the ends of said fins along one edge of said radiator having an opening therein communicating with said one edge of said radiator and said second heated air outlet chamber, and a blower means communicating with said opening in said cover plate for drawing air from said fresh air inlet chamber through said radiator to be heated thereby and for supplying the heated fresh air to the vehicle windshield defroster.

2. A vehicle heater comprising an elongated flat radiator having a plurality of fins extending transversely of the flat faces thereof, partition means abutting one face of said radiator providing a fresh air inlet chamber intermediate the ends of the radiator and recirculating air inlet chambers on opposite sides of the fresh air inlet chamber, partition means abutting the other side of said radiator forming a defroster chamber registering with a portion of said fresh air inlet chamber and a pair of heated air outlet chambers on opposite sides of said defroster chamber and each registering with one of said recirculating air inlet chambers and different portions of said fresh air inlet chamber, fan means of the axial delivery type in each of said heated air outlet chambers for drawing air through said radiator, a cover plate overlying the ends of said fins along one edge of said radiator having an opening therein communicating with said defroster chamber, and blower means of the radial delivery type having the inlet opening thereof communicating with said opening in said cover plate for drawing air from said fresh air inlet chamber across said radiator to heat the air and for supplying the heated air to the vehicle windshield defroster.

3. An automotive heater comprising a housing including a rectangular frame having opposed sides and ends, a front wall having heated air discharge vents therein detachably abutting the sides and ends of the frame, means for attaching said housing to a vehicle, partitions in said housing secured to the sides of said frame and extending transversely thereof and spaced from said front wall to provide separate air inlet chambers adapted for communication with different sources of air, a radiator in said housing between said front wall and said partitions and abutting the forward edges of said partitions, a plate having a fan opening therein detachably secured to the ends of said frame in parallel spaced relation to said radiator, partitions secured to said plate about said opening abutting said radiator to provide a heated air outlet chamber registering with portions of said air inlet chambers, said plate and said partitions carried thereby retaining said radiator in position in said housing against said first-mentioned partitions, and a fan motor detachably secured to said front wall in alignment with said opening in said plate having a fan carried thereby disposed in said opening whereby said fan motor may be removed by removal of said front wall without removing said housing and said radiator may be removed from the front of said housing upon detachment and removal of said plate therefrom.

4. An automotive heater comprising a housing having a bottom wall, end walls and a partition wall secured to said end walls extending in spaced relation to said bottom wall, a front wall detachably secured to said end walls and having heated air discharge vents therein, means for attaching said housing to a vehicle, partitions in said housing secured to said bottom wall and extending transversely between said bottom wall and said partition wall to provide separate air inlet chambers adapted for communication with separate sources of air, a radiator in said housing between said front wall and said partitions and abutting the forward edges of said partitions, a plate having an opening therein, means for detachably securing said plate to the end walls of said housing in spaced relation to the front of said radiator, a partition member secured to said plate about said opening and abutting said radiator to provide a first heated air outlet chamber within said partition member and a second heated air outlet chamber about said partition member, said plate and the partition member carried thereby retaining said radiator in position in said housing against the forward edges of said partitions, a fan motor detachably secured to said front wall in alignment with said opening in said plate and having a fan carried thereby disposed in said opening to draw air over said radiator and discharge the air through said vents in the front wall, said partition wall having an opening therein communicating with said second outlet chamber, and a blower on said partition wall for drawing air over said radiator and through said last-mentioned opening, said fan motor being removable from said housing with said front wall, said plate and the partition member carried thereby being removable through the front of said housing whereby said radiator may be serviced or removed through the front of the housing without detaching the housing from the vehicle.

5. An automotive heater comprising a housing, an elongated radiator extending across said housing, air inlet means communicating with said radiator at one side thereof, an elongated plate mounted in said housing spaced from the other side of said radiator and having fan openings in opposite end portions, partition means disposed about each of said openings and extending between said plate and said radiator to provide a pair of outlet chambers spaced from the top of said radiator and a third outlet chamber between said pair of outlet chambers and extending along the top portion of said radiator, a fan of the axial delivery type disposed in each of said openings in said plate for drawing air across the segments of said radiator aligned with said pair of outlet chambers, a cover plate overlying the top of said radiator and having an opening therein communciating with said third chamber, and a blower of the radial delivery type mounted on said last-mentioned plate and having the vortex opening thereof communicating with said opening in said cover plate for drawing air across the segment of said radiator communicating with said third chamber.

6. An automotive heater comprising a housing, an elongated flat radiator having a plurality of fins extending transversely of the flat faces thereof, air inlet means communicating with the radiator on one side thereof, an elongated plate mounted in said housing spaced from the other side thereof and having fan openings in opposite end portions registering with different segments of said radiator, partition means disposed about each of said openings and extending between said plate and said radiator to provide a pair of outlet chambers therebetween spaced from the top of said radiator and a third outlet chamber between said pair of outlet chambers and extending along the top portion of said radiator, a fan of the axial delivery type disposed in each of said openings in said plate for drawing air across the segments of said radiator aligned with said pair of outlet chambers, partition means overlying the ends of said fins along the top of said radiator and abutting said plate, said partition means having an opening therein communicating with said third chamber, and a blower of the radial delivery type mounted on said plate and having the vortex opening thereof communicating with said opening in said last-mentioned partition to draw air across the segment of the radiator communicating with said third chamber.

7. An automotive heater comprising a housing, an elongated flat radiator having a plurality of fins extending transversely of the flat faces thereof, air inlet means communicating with the radiator on one side thereof, an elongated plate mounted in said housing spaced from the other side thereof and having fan openings in opposite end portions registering with different segments of said radiator, partition means extending between said plate and said radiator providing a pair of outlet chambers each communicating with one of said openings and with different segments of said radiator, said partitions defining a third outlet chamber located between said pair of outlet chambers and communicating with another segment of said radiator, a fan of the axial delivery type disposed in each of said openings in said plate for drawing air across the segments of said radiator aligned with said pair of outlet chambers, partition means overlying the ends of said fins along the top of said radiator and abutting said plate, said partition means having an opening therein communicating with said third chamber, and a blower means having the inlet opening thereof communicating with said opening in said last-mentioned partition means to draw air across the segment of the radiator communicating with said third chamber.

8. A vehicle heater comprising a housing, a radiator disposed within said housing, partition means abutting against one side of said radiator forming a fresh air inlet chamber and a recirculating air inlet chamber adjacent different segments of said radiator, partition means abutting against the other side of said radiator forming a first heated air outlet chamber registering with said recirculating chamber and a portion of said fresh air inlet chamber and a second heated air outlet chamber registering with a different portion of said radiator than that encompassed by said first heated air outlet chamber, fan means in said first outlet chamber for drawing air through said radiator from said recirculating air inlet chamber and from said fresh air inlet chamber, and blower means having the inlet thereof communicating with said second heated air outlet chamber for drawing air from said fresh air inlet chamber through said radiator to be heated thereby and for supplying the heated fresh air to the vehicle windshield defroster.

9. An automotive heater comprising a housing, an elongated radiator in said housing, partition means abutting one face of said radiator providing a fresh air inlet chamber intermediate the ends of the radiator and recirculating air inlet chambers on opposite sides of the fresh air inlet chamber, partition means abutting the other side of the radiator forming a defroster chamber registering with a portion of said fresh air inlet chamber and a pair of heated air outlet chambers on opposite sides of the defroster chamber, each of said heated air outlet chambers registering with one of said recirculating air inlet chambers and different remaining portions of said fresh air inlet chamber, fan means of the axial delivery type in each of said heated air outlet chambers for drawing air through the radiator, and blower means communicating with said defroster chamber for withdrawing air therefrom and for supplying the heated air to the vehicle windshield defroster.

10. A vehicle heater comprising an elongated housing having a bottom wall and upstanding end walls secured to the bottom wall, an elongated flat radiator extending between said end walls, partition means abutting one side of said radiator and extending upwardly from said bottom wall providing a fresh air inlet chamber intermediate the ends of said radiator and recirculating air inlet chambers on opposite sides of the fresh air inlet chamber, partition means abutting the other side of said radiator forming a defroster chamber registering with a portion of the fresh air inlet chamber and a pair of heated air outlet chambers on opposite sides of said defroster chamber, part of each of said heated air outlet chambers registering with one of said recirculating air inlet chambers, the remaining part of each of said heated air outlet chambers registering with different remaining portions of said fresh air inlet chamber whereby fresh air is supplied to the said remaining part of each of the heated air outlet chambers, a cover plate overlying the top of said radiator having an opening therein communicating with said defroster chamber, said end walls having recirculating air inlet ports therein communicating with said recirculating air inlet chambers to admit air thereintto from the bottom, top, and the end of each of the recirculating air inlet chambers remote from the fresh air inlet chamber, fan means of the axial delivery type in each of said heated air outlet chambers for drawing air through the radiator from the recirculating air inlet chambers and from the registering portions of the fresh air inlet chamber, blower means communicating with said opening in the cover plate for drawing air from said defroster chamber and for supplying the heated air to the vehicle windshield defrosters, means on said housing for mounting the back thereof against the wall of a vehicle with the rear edges of said end walls and said first mentioned partition means abutting thereagainst, and means engaging the bottom wall of the housing for supporting the latter in spaced relation to the floor of the vehicle to permit the passage of air into the recirculating air inlet chambers.

References Cited in the file of this patent

UNITED STATES PATENTS

| Number | Name | Date |
|---|---|---|
| 1,704,971 | Howell | Mar. 12, 1929 |
| 1,990,468 | Bridges | Feb. 12, 1935 |
| 2,242,337 | Aufiero | May 20, 1941 |
| 2,274,033 | Booth | Feb. 24, 1942 |
| 2,322,041 | Mayo | June 15, 1943 |
| 2,326,242 | Mayo | Aug. 10, 1943 |
| 2,331,691 | Hubbard | Oct. 12, 1943 |

FOREIGN PATENTS

| 521,507 | Great Britain | May 23, 1940 |